United States Patent [19]

Yanagisawa et al.

[11] 4,162,350

[45] * Jul. 24, 1979

[54] MAGNETIC RECORD MEMBER

[75] Inventors: Masahiro Yanagisawa; Yoji Suganuma, both of Tokyo, Japan

[73] Assignee: Nippon Electric Co., Ltd., Tokyo, Japan

[ * ] Notice: The portion of the term of this patent subsequent to Jan. 17, 1995, has been disclaimed.

[21] Appl. No.: 924,185

[22] Filed: Jul. 13, 1978

Related U.S. Application Data

[63] Continuation-in-part of Ser. No. 700,191, Jun. 28, 1976, abandoned.

[30] Foreign Application Priority Data

Jul. 1, 1975 [JP] Japan .................................. 50/81201

[51] Int. Cl.$^2$ ............................................ B32B 15/00
[52] U.S. Cl. ..................................... 428/633; 427/131; 427/132; 428/652; 428/928
[58] Field of Search ............... 428/652, 632, 633, 687, 428/680, 928; 427/131, 132

[56] References Cited

U.S. PATENT DOCUMENTS

| 3,476,595 | 11/1969 | Nacci | 428/339 |
| 3,677,843 | 2/1970 | Reiss | 427/131 |
| 3,993,846 | 11/1976 | Higuchi et al. | 428/447 |
| 4,005,242 | 1/1977 | Kopke et al. | 428/447 |
| 4,069,360 | 1/1978 | Yanagisawa et al. | 427/131 |

OTHER PUBLICATIONS

IBM Tech. Disc. Bull., vol. 15, No. 11 (3304) 4/73.

*Primary Examiner*—Arthur J. Steiner
*Attorney, Agent, or Firm*—Ostrolenk, Faber, Gerb & Soffen

[57] ABSTRACT

The thin film magnetic medium of a magnetic disc, and the read/record head employed with the disc are both protected from abusive use and physical damage as well as chemical damage (including damage due to heat and/or humidity) by a polysilicate layer, formed upon the magnetic medium. Inexpensive methods of forming the protective film (which methods lend themselves to mass production) are described. These methods are a small fraction of the cost of present day techniques.

7 Claims, 1 Drawing Figure

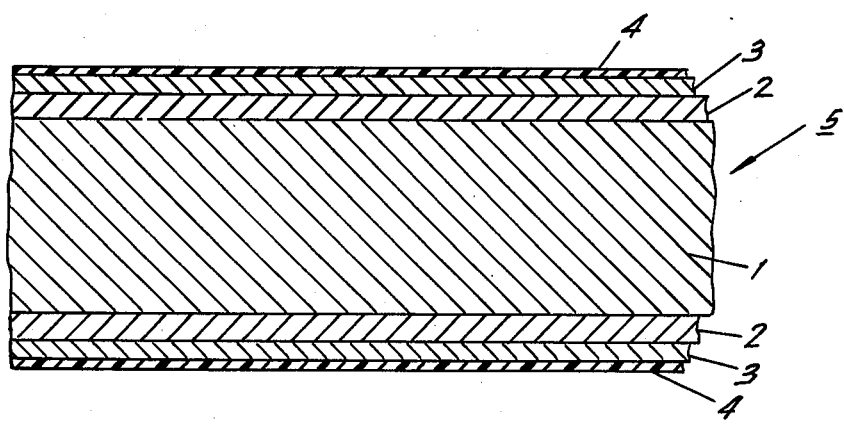

MAGNETIC RECORD MEMBER

This is a continuation-in-part of application Ser. No. 700,191, filed June 28, 1976 now abandoned.

BACKGROUND OF THE INVENTION

This invention relates to an improved magnetic record member for use in magnetic recording devices such as a magnetic disc and a magnetic drum and a process for manufacturing same.

A magnetic recording device basically consists of magnetic heads for recording and reproducing (referred to simply as "head" hereinafter) and magnetic record members.

In general, recording and reproducing systems for the magnetic recording device may be classified into two types. In one system, upon the initiation of operation, a head is brought into contact with the surface of a magnetic record member and then, the record member is rotated at a given speed in a manner to provide a spacing between the head and the magnetic record member surface, thereby enabling the recording and reproducing operations. According to this system, upon completion of operation, rotation of the record member is stopped in a state where the head and record member are maintained in frictional contact with each other as is the case with the starting of operation.

In another system, after a magnetic record member is rotated at a given speed beforehand, a head is suddenly urged against the record member surface to provide a spacing due to an air layer created between the head and the record member so as to perform the recording and reproducing operations. As a result, the latter system brings the head and record member into frictional contact with each other when the head is urged against the record member surface.

Such frictional contact tends to harm the head and the magnetic record member so that satisfactory recording and reproducing operations become impossible. In addition, there is a case where the head unexpectedly contacts the record member surface so that the head and record member may both be damaged. Also, even if the head and record members are not damaged, a load is increasingly imposed on a spring for supporting the head as the contacting frequency of the head and record member is increased. For this reason, the spacing between the head and the recording surface of the member is varied. Besides these, a magnetic metal thin film medium used as the record member is possibly subjected to a high temperature and high humidity environment so that the record member surfaces experiences corrosion. This affects the magnetic characteristics of the member, and as a result, deteriorates the recording and reproducing characteristics thereof. Consequently, this requires the provision of a protective film or an over-layer on the surface of the magnetic metal thin film medium serving as one magnetic memory medium of the magnetic recording device.

The following characteristics must be required for the aforesaid protective film.

(1) A protective film medium should withstand an unexpected or inadvertent contact of a head with a magnetic record member during recording and reproducing operations (resistance to head-crushing).

(2) The load imposed on a spring should be small, which is caused by a frictional force for supporting the head exerted by frictional contact of the head with the record member at a plurality of contacting cycles (lubricity).

(3) Even due to such frictional contacts at a plurality of contacting cycles, the protective film medium should be maintained in a state which is free of damage and peeling (anti-abrasion characteristic).

(4) Even at high temperature and high humidity conditions, the protective film medium should protect the magnetic metal thin film medium so as to insure desired recording and reproducing characteristics (resistance to environmental conditions).

(5) The protective film medium should not impair the magnetic characteristics of a metal substrate including the magnetic memory medium.

U.S. Pat. No. 3,466,156 teaches the use of a polymer film and a wax lubricant film as a protective film formed by coating polyamide resins and ceresin wax. However, the use of this protective film has several disadvantages. In other words, the polymer film and the wax lubricant (film) are easily flaked off by frictional contact of a head against a magnetic record member at a plurality of contacting cycles. In this manner, this protective film fails to meet the characteristics (2) and (3).

Moreover, it is known that $SiO_2$ is coated using a spattering process on a magnetic record member as a protective film. However, the film formed by spattering $SiO_2$ fails to meet the characteristics (1) and (2). Also, a successful attempt to meet the characteristics (1) to (5) is known in the technique for coating glass through a spattering process as a protective film. However, the use of the spattering process unavoidably brings about the difficulty in the manufacture on a mass production basis, and hence, the cost increase in the manufacture. Also, there is another disadvantage in that the size increase in the magnetic record member is accompanied with that of the target for spattering. For this reason, technical difficulty is encountered, with an unavoidable increase in the total cost of the apparatus.

It is an object of the present invention to provide a magnetic record member and a process for manufacturing the same free of the aforesaid shortcomings in the prior art magnetic record members.

BRIEF DESCRIPTION OF THE INVENTION

The present magnetic record member comprises an alloy disc, a non-magnetic alloy layer coated on the alloy disc and polished to a mirror surface, a magnetic metal thin film medium coated on the polished non-magnetic alloy layer and a polysilicate film coated on the magnetic metal thin film medium.

The present manufacturing process for the magnetic record member comprises the steps of: forming a film of a non-magnetic alloy on the surface of an alloy disc; polishing the non-magnetic alloy layer thus formed to a mirror surface; forming a magnetic metal thin film medium on the surface of the highly polished non-magnetic alloy layer; applying a solution of tetrahydroxy silane derived by hydrolysis of tetraalkoxy silane onto said film medium; baking the disc after having thus prepared the composite layers at a temperature of more than 100° C. in such a manner that variation in the magnetic property of the thin film medium will not adversely affect the recording and reproducing characteristics of the magnetic record member; and forming a polysilicate film on the thin film medium.

Also, the present magnetic record member comprises a mirror-polished alloy disc, a magnetic metal thin film medium coated directly on the alloy disc and a polysilicate film medium coated on the magnetic metal thin film is thus provided.

The present manufacturing process for the last described magnetic record member comprises the steps of: forming a magnetic metal thin film medium directly on the surface of the alloy disc polished to a mirror surface; applying a solution of tetrahydroxy silane derived by hydrolysis of tetraalcoxy silane onto said thin film medium; baking the disc after having thus prepared the layer at a temperature greater than 100° C. in such a manner that the variation in the magnetic property of the thin film medium will not give adverse effects on the recording and reproducing characteristics of the magnetic record member; and forming a polysilicate film on the thin film medium.

BRIEF DESCRIPTION OF THE FIGURE

The objects and other features of the present invention will be described more in detail in conjunction with the accompanying drawing which shows an end view of one embodiment of the present invention.

DETAILED DESCRIPTION OF THE INVENTION

In the drawing, a magnetic record member 5 of the present invention comprises an alloy disc 1, a non-magnetic alloy layer 2 coated on the surface of the alloy disc 1, a magnetic metal thin film medium 3 coated on the highly polished surface or mirror surface of the non-magnetic alloy layer 2 and a protective film 4 made of polysilicate and formed on the thin film medium 3.

The present record member 5 is manufactured by the steps of: plating a non-magnetic alloy on the surface of the alloy disc 1; forming a magnetic metal thin film medium on the polished surface of the thus formed alloy layer 2 by a plating process; applying a solution of tetrahydroxy silane derived by hydrolysis of tetraalkoxy silane on the surface of the thin film medium 3; baking the disc after having thus prepared the composite layers at a temperature greater than 100° C. in a manner that variation in the magnetic property of the thin film medium 3 will not adversely effect the recording and reproducing characteristics of the magnetic record member; and thereby forming the polysilicate film 4, which is a polymer of tetrahydroxy silane, on the surface of the thin film medium 3.

The alloy disc 1 must be finished to a slightly topographic surface (no more than 50 μm (50 microns) in the circumferential direction and no more than 10 μm (10 microns) in the radial direction of the disc.

This is because an increase in topograph leads to a failure of a head to satisfactorily float or fly above the magnetic record member surface upon recording or reproducing with the result of variation in spacing of the head from the record member. This varies the recording and reproducing characteristics of the record member, either in cases where the head makes contact with the record member surface or in cases where the head is spaced from the member surface.

The surface of the non-magnetic alloy layer 2 plated on the surface of the alloy disc 1 is highly polished to a surface roughness less than 0.04 μm by mechanical polishing. It is to be noted that if a metal which may be polished to a mirror surface is used as the alloy disc 1, the alloy layer 2 is unnecessary. The thin film medium 3 adaptable for high density recording is placed on the surface of the alloy layer 2. The protective film 4 made of polysilicate protects the medium 3 from experiencing any frictional contact and chemical attack caused by prevailing temperature and humidity. The protective film 4 may be readily formed by applying a solution of tetrahydroxy silane derived by hydrolysis of tetraalkoxy silane onto the medium 3 which is rotated with the disc 1 and the layer 2, followed by drying and baking processes.

The higher the flying height of the head (i.e., the spacing between the head and the protective film surface, upon recording and reproducing of the magnetic record member), the more stable will be the record member against head-crushing. However, for the sake of recording and reproducing of the record member, a smaller spacing (spacing between the head and the surface of the record member, upon recording and reproducing) is more advantageous. For this reason, it is essential to minimize the thickness of the protective film 4. In this respect, a thickness of the order of 0.1 μm is preferable, considering the strength of the protective film 4. The range of the thickness of the protective film 4 can be taken up to 0.3 μm because the thickness exceeding the aforesaid limit of 0.3 μm causes cracking in the protective film due to stress created upon polymerization of tetrahydroxy silane. As will be described hereinafter, it is indispensable to bake the protective film 4 on the magnetic record member at a temperature more than 100° C., while the upper limit of the baking temperature depends on a thermally changing temperature of characteristics of the film medium 3. With the medium 3, uniformity of a coercive force is lost at temperatures over 300° C., thereby impairing the recording and reproducing characteristics of the record member. For this reason, the range of the baking temperatures must be set from 150° C. to 300° C. Temperatures higher than 250° C. cause magnetization in the non-magnetic alloy layer 2, resulting in a decrease in the reproduced output. However, temperatures above 250° C. will not vitally affect the above mentioned characteristics of the magnetic record member. Also, temperatures exceeding 350° C., however, cause cracking in the record member due to a difference in thermal expansion coefficients between the alloy disc 1 and the alloy layer 2.

An amorphous inorganic material having a structure approximating that of $SiO_2$ glass is coated on the surface of the record member 5 as the protective film 4. The amorphous material as used herein is a kind of an inorganic high molecular compound of a net structural formula shown below in which each Si-O bond consisting of covalent bonds and Si-OH ... O bonds consisting of hydrogen bonds are linked together three-dimensionally (this material will be referred to as polysilicate, hereafter):

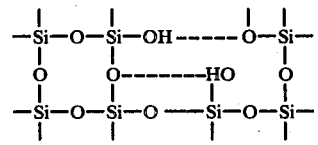

The solid lines represent the covalent bonds while the broken lines represent the hydrogen bonds in the above net structural formula.

The above mentioned polysilicate is produced by a dehydrating-condensation-polymerization of tetrahydroxy silane derived by hydrolysis of tetraalkoxy silane. The starting material for tetrahydroxy silane, i.e., tetraalkoxy silane is given in the formula of Si(OR)$_4$, wherein R represents an alkyl radical, i.e., any one of methyl, ethyl, propyl and butyl radicals.

The tetraalkoxy silane is soluble in a low grade alcohol and is readily hydrolized by carboxylic acid to give the tetrahydroxy silane. This tetrahydroxy silane is highly activated so that it is difficult to isolate this from others, and is relatively highly stable in alcohol, particularly in methyl alcohol, ethyl alcohol, propyl alcohol or butyl alcohol. Upon application of an alcohol solution of tetrahydroxy silane to the surface of the magnetic metal medium 3 and upon evaporation of a solvent thereof, the polymer of the three dimensional net structural formula, i.e., polysilicate is formed as the film 4 on the surface of the medium 3 by the dehydrating condensation-polymerization of the silane radicals Si-OH as follows:

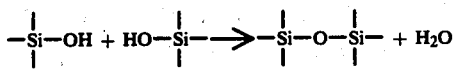

In this case, unreacted silanol-radical Si-OH remains in polysilicate, thereby enhancing the adsorption and occlusion effects thereof, and the unreacted silanol radical may be reduced in amount by baking the polysilicate at a high temperature. Thus, the density of the polysilicate will be further increased. As a result, polysilicate with strong covalent bonds of Si-O may be obtained rather than with weak hydrogen bonds of a silanol radical so that the hard protective film 4 may be produced. It is desirable from the viewpoint of hardness required for the film 4 that the polysilicate is heated at temperatures greater than 100° C. On the other hand, in order to obtain a surface characteristic with a lower frictional coefficient brought about by the adsorption and occlusion effects of water or oil due to the unreacted silanol radical, it is desirable to heat the polysilicate at temperatures less than 750° C. at which level the unreacted silanol radical disappears. The infrared-adsorption-spectrum analysis of this unreacted silanol radical reveals that an adsorption-spectrum of the silanol radical Si-OH appears at a frequency of 3400 cm$^{-1}$, and suggests that the unreacted silanol radical is contained in the polysilicate. However, in the case where the polysilicate is baked at temperatures greater than 750° C., the infrared adsorption spectrum of the silanol radical Si-OH disappears.

As will be described later, the prior art protective film consisting of SiO$_2$ film prepared by the spattering process has a tendency to readily cause head-crushing compared with the protective film 4 consisting of polysilicate prepared through the process of the invention, and has a degraded surface characteristic.

In contrast thereto, in the protective film 4 formed through the present process, the unreacted silanol radical confirmed by the infrared-adsorption-spectrum analysis is included. So, film 4 has an improved surface characteristic with a smaller frictional coefficient due to the adsorption and occlusion of water or oil into the silanol radical remaining in the film. For this reason, resistance to head-crushing, anti-abrasion property and lubricity for the magnetic record member 5 are consequently improved by using the film 4. Since an adsorbing force of water or oil into the silanol radical is so great that even if the record member 5 is heated to 200° C., there results no change in its resistance to head-crushing as well as in the anti-abrasion property.

A polysilicate produced by a dehydrating-condensation-polymerization of tetrahydroxy silane involves the following reaction:

However, this reaction does not proceed to the right-hand direction completely, permitting unreacted Si(OH)$_4$ to remain as silanol radicals. More specifically, the weight ratio n of water produced due to said reaction is represented by equation (1) where $\alpha$ is the reaction rate and M is the molecular weight.

$$n = \frac{2\alpha M_{H_2O}}{M_{Si(OH)_4}} \quad (1)$$

Also, the Si(OH)$_4$-conversion weight ratio m of silanol radicals in non-volatile material is expressed:

$$m = \frac{(1-\alpha)M_{Si(OH)_4}}{(1-\alpha)M_{Si(OH)_4} + \alpha M_{SiO_2}} = \frac{2M_{H_2O} - nM_{Si(OH)_4}}{2M_{H_2O} - nM_{Si(OH)_4} + nM_{SiO_2}} \quad (2)$$

In this case, because of the relationship of $M_{H_2O}=18$, $M_{Si(OH)_4}=96$ and $M_{SiO_2}=60$, equation (3) is obtained:

$$m = \frac{3-8n}{3(1-n)} \quad (3)$$

To measure the weight change of polysilicate film with respect to the baking temperatures, the experimental data shown in Table A was obtained.

Table (A)

| Baking Temperatures (degrees centigrade) | n × 100 (weight percent) | m × 100 (weight percent) |
|---|---|---|
| 350 | 35 | 10 |
| 200 | 30 | 29 |
| 100 | 21 | 56 |
| 750 | 37 | 2 |

Table (A) shows that the polysilicate film baked at the temperature of 750° C. contains a mere 2% silanol radicals coinciding with the above mentioned analysis of the infrared absorption spectrum of the unreacted silanol radical.

Because of the above mentioned hardness of polysilicate and because of the absorption and occulsion effects of silanol radicals, the baking temperatures of a magnetic record member should be selected within the range of 100° C. to 750° C. Consequently, the Si(OH)$_4$-converted weight percent of silanol radicals must lie in a range of 2% to about 56%. From the standpoint of practical use, however, the baking temperatures of said record member should be selected in a range of 100° C. to 350° C. It follows therefore that the Si(OH)$_4$-converted weight percent of silanol radicals is in the range of about 10% to 56%.

The following examples illustrate the features of the processes for manufacturing the present magnetic record member 5, and descriptions therefor will be given in comparison with prior art examples.

PRIOR ART EXAMPLE 1

A disc-type aluminum alloy substrate was finished to a surface having a slight topograph using turning and heat-flattening processes. The topograph in this case should be less than 50 μm in the circumferential direction and 10 μm in the radial direction. Then a nickel-phosphorus (Ni-P) non-magnetic alloy was plated on the aluminum alloy substrate to about 50 micron-thickness. The Ni-P-plated film was then finished to a mirror surface having a surface roughness of less than 0.04 μm and a thickness of about 30 μm using a mechanical polishing process. Next, a cobalt-nickel-phosphorus (Co-Ni-P) magnetic metal alloy was plated as a magnetic memory medium on the surface of the Ni-P plated film to about 0.05 micron thickness. $SiO_2$ was then coated on the surface of the Co-Ni-P magnetic alloy film as a protective film to a thickness of about 0.1 microns using a spattering process. Thus, a magnetic record member was obtained for a magnetic disc device.

PRIOR ART EXAMPLE 2

A Ni-P non-magnetic alloy was plated on the surface of a disc-type aluminum alloy in a manner similar to that adopted in the prior art Example 1. Then, a cobalt-nickel-phosphorus (Co-Ni-P) alloy was plated on the surface of the (Ni-P) non-magnetic alloy layer. Borosilicate glass of a composition shown below was then coated as a protective film on the surface of the Co-Ni-P alloy layer thus plated to 0.1 millimeter thickness with the use of the spattering process, thereby providing a magnetic record member serving as a magnetic disc device:

| | |
|---|---|
| $SiO_2$ | 50.2% |
| $BaO$ | 25.1% |
| $B_2O_3$ | 13.0% |
| $Al_2O_3$ | 10.7% |
| $As_2O_3$ | 0.4% |

EXAMPLES OF THE PRESENT INVENTION

EXAMPLE 1

A disc-type aluminum alloy was finished to obtain a surface having a slight topograph by turning and heat-flattening processes so that an alloy disc 1 of desired finish may be made. Then, a nickel-phosphorus (Ni-P) non-magnetic alloy was plated on the aluminum alloy surface to form a non-magnetic alloy layer 2 having about 50 micron-thickness. The surface of the Ni-P-plated film was polished to form a mirror finish surface, i.e., to obtain a surface roughness less than 0.04 μm and of about 30 micron-thickness using a mechanical polishing process. Then, a cobalt-nickel phosphorus (Co-Ni-P) magnetic metal alloy was plated thereon to provide a magnetic metal thin film medium 3 having about 0.05 micron-thickness. Next, a solution of a composition shown below was thoroughly mixed and filtered through a filtering film to remove precipitated $SiO_2$ or dust. The solution was applied onto the surface of the Co-Ni-P magnetic metal alloy layer through a spin coating process. More particularly, the disc-type aluminum alloy substrate on which the Ni-P and the Co-Ni-P film were plated in this order, was rotated at a speed greater than 200 r.p.m. (revolutions per minute) in a horizontal plane, while said solution having the above mentioned composition was being discharged from its reservoir to the disc surface. The discharged solution was thus spread over the disc surface toward its outer periphery due to the centrifugal force. When a solvent (ethyl and butyl alcohols) of the solution discharged on the disc surface was evaporated, a polysilicate film was formed on the disc surface as the protective film 4. The disc having the protective film 4 of polysilicate of 0.1 micron-thickness was then placed at a room temperature (about 25° C.) for a while so as to evaporate the solvent of ethyl and butyl alcohols remaining in the polysilicate film. In this manner, a protective film was formed on the disc surface for the magnetic disc device.

COMPOSITION (referred to above)

Ethyl alcohol solution including tetrahydroxy silane of eleven weight percent . . . twenty weight percent n-butyl alcohol . . . eighty weight percent.

EXAMPLE 2

In a similar process to Example 1 of the present invention, a Ni-P film and a Co-Ni-P film were plated in this order on an aluminum alloy disc surface. Then, a polysilicate film was formed to 0.1 micron-thickness on the disc surface using the spin coating process. The disc having the polysilicate film was then baked in an electric furnace at a temperature of 100° C. for eight hours.

EXAMPLE 3

After a polysilicate film was prepared on the disc surface similarly to Example 2 of the present invention, the disc was baked in an electric furnace at a temperature of 150° C. for five hours.

EXAMPLE 4

A polysilicate film was formed on the disc surface according to a similar process to Example 2 of the present invention, and then, the disc was baked in the electric furnace at a temperature of 200° C. for three hours.

EXAMPLE 5

Similar to Example 2 of the present invention, a polysilicate film was formed on the disc surface and then, the disc was baked in the electric furnace at a temperature of 250° C. for three hours.

EXAMPLE 6

Likewise, a polysilicate film was formed on the disc surface in a process similar to Example 2 of the present invention, and next, the disc was baked in the electric furnace at a temperature of 300° C. for one hour.

EXAMPLE 7

Similar to Example 2 of the present invention, a polysilicate film was formed on the disc surface, and next, the disc was baked in the electric furnace at a temperature of 350° C. for one hour.

EXAMPLE 8

According to a process similar to Example 1 of the present invention, a Ni-P film and a Co-Ni-P film were plated in this order on an aluminum alloy disc surface. Then, a Ni-P non-magnetic alloy film of 0.4 micron-thickness was formed by the plating on the disc surface, and after this, a polysilicate film was formed thereon to 0.1 micron-thickness by means of the spin coating process. Finally, the disc was baked in an electric furnace at a temperature of 200° C. for three hours.

As has been described previously, film thickness of polysilicate of more than 0.3 μm cannot be adopted because of cracking in the film.

As a result, as described in Example 8 of the present invention, the Ni-P non-magnetic alloy was plated on the surface of the Co-Ni-P magnetic film to a thickness of 0.4 microns. Then, polysilicate was applied onto the surface of the Ni-P non-magnetic alloy layer to a thickness of 0.1 micron so as to form a protective film of a total of 0.5 micron-thickness, i.e., the total thickness of the aforesaid Ni-P non-magnetic alloy layer and the polysilicate film formed on the surface of the Co-Ni-P magnetic metal thin film.

Operation tests were given to the respective magnetic discs made according to the prior art Examples 1 and 2 and Examples 1 to 8 of the present invention by repeating the start and stop operations during the recording and reproducing states in which each head is brought into frictional contact with the magnetic disc surface whenever the above mentioned start and stop operations are performed. In these tests, the following observations were measured:

(1) frequencies of the occurrence of head-crushing during the repeated operation tests.

(2) variation in the reproduced output through the head due to a plurality of frictionally contacting cycles of the head and magnetic disc, and (3) observation of the protective film-peeling due to a plurality of frictional contact cycles of the head against the magnetic disc.

In addition, measurements were made of each magnetic disc produced according to the prior art Examples 1 and 2 and the present Examples 1 to 8 so as to check the following:

(4) variation in both reproduced output through the head and surface condition of the protective film, and (5) uniformity of the reproduced output. Table 1 shows the above mentioned test results.

caused head-crushing frequently, the tests were withheld after one thousand frictional contact tests. As a result, it was found that the head of the magnetic disc in the prior art Example 1 bit the disc surface, and continuous recording and reproducing operations became impossible at one hundred repeated frictional contact tests of the head against the magnetic disc.

In contrast thereto, in the cases of the prior art Example 2 and Examples 1 to 8 of the present invention, there occurred no biting of the head into the magnetic disc surface to an extent where the Co-Ni-P magnetic metal thin film medium was reached. Therefore, the recording and reproducing operations were continued normally.

Concerning the characteristic (2), a reproduced output voltage through an amplifier was observed with an oscilloscope during flying or floating movement of the head placed above the magnetic disc. Then, the comparison of an initial output with an output after thirty-thousand repeated frictional contacts tests of the head against the magnetic disc was performed. The test results revealed that the magnetic discs produced according to the prior art Example 2 and the present Examples 1 to 8 are free of any decrease in output within an accurate range of measurements. In contrast, the disc obtained by the prior art Example 1 caused head-crushing with the result that the frictional contact tests of the head against the magnetic disc were interrupted before reaching an intended 30,000 cycles. In other words, the aforesaid operation tests were repeated to 1,000 cycles with the result of ten percent output decrease.

As regards the characteristic (3), the frictional contact test of the head against the magnetic disc was repeated to 30,000 cycles. Next, head traces on a track on the magnetic disc surface were observed with a microscope for the measurement of peeled area of the magnetic disc surface, but no peeling was observed on the magnetic disc surface prepared by the prior art Table 1

| | Prior art Examples and Examples of the present invention | (1) head-crushing | (2) variation in output | (g) peeled area (ratio) | (4) environmental test | (5) variation in output |
|---|---|---|---|---|---|---|
| | prior art Example 1 | once per 100 cycles | 10% | 5% | no change noticed | <30% |
| | prior art Example 2 | none | none | none | " | " |
| PRESENT INVENTION | Example 1 | " | " | 10% | — | <30% |
| | Example 2 | " | " | none | no change noticed | " |
| | Example 3 | " | " | " | " | " |
| | Example 4 | " | " | " | " | " |
| | Example 5 | " | " | " | " | " |
| | Example 6 | " | " | " | " | " |
| | Example 7 | " | " | " | " | >30% |
| | Example 8 | " | " | " | " | <30% |

DESCRIPTION OF TEST RESULTS

Regarding characteristic (1), thirty thousand frictional contact tests of the heads against the magnetic discs given in all of the Examples were performed. In the course of the tests, flakes of the protective film were removed from the magnetic disc surface which caused head-crushing, and then, the tests were continued for another track of the same disc surface. However, since the magnetic disc completed by the prior art Example 1

Example 2 and the present Examples 2 to 8.

On the other hand, the magnetic disc obtained in the present invention, Example 1, had a peeled area equal to ten percent of the head contacting area on its track. However, in the case of the prior art Example 1, the frictional contact test could not be carried out up to 30,000 cycles due to head-crushing so that the test was stopped at 1,000 cycles. The resultant peeled area was found to be about 5% of the head contacting area on its track.

As for the characteristic (4), the environmental test was carried out as follows: The environmental test consisting of two cycles of test performed at a temperature of 65° C. and at a relative humidity of 90% for four hours and of one cycle at a temperature of −40° C. (minus forty degrees Centigrade) for three hours was repeated ten times. The test results revealed no change in magnetic disc surfaces prepared according to the prior art Example 1 and the present invention, Examples 2 to 8.

It is to be noted that the environmental test was not performed for the magnetic disc prepared in the present invention, Example 1, because the disc is subjected to heating to 65° C.

For the characteristic (5), variation in reproduced output (ratio of the difference between the maximum and the minimum head-reproducing outputs obtained from the same track to the maximum output thereof) was checked. As a result, variation in the reproduced output more than thirty percent was not found in the magnetic discs of the prior art Examples 1, 2 and Examples 1 to 6 of the present invention while variation in the reproduced output over thirty percent was found in the magnetic discs of the present invention, Example 7. This is due to the fact that the baking of the magnetic disc at a high temperature caused the lack of uniformity in characteristics of the magnetic record member.

As is apparent from the foregoing, the magnetic discs having protective films of $SiO_2$ formed by the spattering process as in the prior art examples are not suitable for the magnetic record member requiring high reliability.

It was found that magnetic discs having the protective films of polysilicate given in the present examples would have high reliability within a baking temperature range of 100° C. to 300° C. as well as excellent recording and reproducing characteristics.

In addition, magnetic discs having the protective films prepared by the glass-spattering process used in the prior art Example 2 can provide sufficiently high reliability as well as excellent recording and reproducing characteristics. However, the manufacturing yield of the conventional discs per unit hour is 1/10th that of the present magnetic discs having the polysilicate protective films produced on a mass-production basis. Also, the spattering process is accompanied with the use of a complicated vacuum system which requires the expenditure of much time and effort, and is accompanied with the use of a costly spattering apparatus for preparing a protective film on a large size magnetic disc.

On the other hand, the polysilicate films may be formed at a low cost in such a simple manner that an alcohol solution of tetrahydroxy silane may be applied to the base disc surface using the above mentioned spin coating method, alcohol in the alcohol solution may be evaporated, and the thus obtained discs may be baked in the atmosphere. For this reason, the protective films consisting of polysilicate are excellent in characteristics required for the protective films and mass-producibility, and advantageous in manufacturing cost and freedom of size restriction on a magnetic record member.

In the aforesaid respective Examples of the present invention, the aluminum alloy disc, the Ni-P alloy layer, and the Co-Ni-P were used as the alloy disc 1, the non-magnetic alloy layer 2 and the magnetic metal thin film medium 3, respectively, with the result that the baking temperature of the protective film 4 was restricted to a temperature no greater than 300° C. However, it is apparent that by a combination use of an alloy disc having less thermal change, a non-magnetic alloy layer and a magnetic thin film medium, such a temperature restriction can be removed.

In the above mentioned present Examples, in place of the aluminum alloy disc prepared for the disc 1, a titanium alloy may be used, which is allowed to be polished to a surface. Consequently, the non-magnetic alloy layer 2 can be omitted. Next, a magnetic metal thin film medium may be formed on the thus prepared alloy disc by the plating process, and then, a protective film of polysilicate may be formed thereon.

Moreover, in the present invention, Example 8, the Ni-P non-magnetic alloy was plated on the aluminum alloy disc surface, and then the Co-Ni-P magnetic metal thin film medium was plated on the Ni-P non-magnetic alloy polished to a desired surface finish. The Ni-P non-magnetic alloy was then plated thereon followed by the coating of a polysilicate film. Although the protective film was coated on the surface of the Co-Ni-P magnetic metal thin film medium, it is possible to form a protective film of a thickness greater than 0.3 microns by forming the polysilicate coating on the surface of the Ni-P non-magnetic alloy. More particularly, a polysilicate film of more than 0.3 micron-thickness can not be formed because of cracking, while the Ni-P non-magnetic alloy may be plated to the uniform thickness of several tens of microns. In addition, even in the case of Example 1 of the present invention in which the polysilicate film can not be sufficiently hardened, the Ni-P non-magnetic alloy and the polysilicate may be plated in this order on the surface of the Co-Ni-P magnetic metal thin film medium so as to protect the Co-Ni-P magnetic metal medium. More specifically, if a part of the polysilicate film is peeled off, the Ni-P non-magnetic alloy protects the above mentioned thin film medium. Namely, the use of the Ni-P non-magnetic alloy alone may not adequately protect the Co-Ni-P magnetic metal thin film medium because of head-crushing caused by the Ni-P non-magnetic alloy layer. However, the Ni-P non-magnetic alloy has a close relationship with the Co-Ni-P magnetic metal thin film medium in composition and position in the periodic table. For this reason, the former may be firmly plated on the surface of the latter. Thus, if the polysilicate film which reluctantly causes head-crushing is coated on the surface of the Ni-P magnetic alloy layer, the Co-Ni-P magnetic metal thin film medium may be well protected thereby, even if a part of the polysilicate film is peeled off.

Although the present invention has been described above in conjunction with a number of Examples, various modifications and alternatives may be made within the scope of the present invention and the scope of the invention is defined by the claims and not by the Examples recited hereinabove.

What is claimed is:

1. A magnetic record member comprising: an alloy disc; a non-magnetic alloy layer coated on the alloy disc and polished to a mirror surface; a magnetic metal thin film medium coated on the polished non-magnetic alloy layer; and a polysilicate film including 2 to about 56 weight percent silanol radicals coated on the surface of the magnetic metal thin film for protecting, preserving and enhancing the useful life of the record member.

2. A magnetic record member comprising: a mirror polished alloy disc; a magnetic metal thin film medium coated directly on the alloy disc; and a polysilicate film medium including 2 to about 56 weight percent silanol radicals coated on the magnetic metal thin film medium thus provided.

3. A magnetic record member comprising:
an alloy disc;
a non-magnetic alloy layer coated on the alloy disc and polished to a mirror surface;
a magnetic metal thin film medium coated on the polished non-magnetic alloy layer; and
a polysilicate film containing 2 to about 56 weight percent silanol radicals formed by the dehydrating-condensation-polymerization of tetrahydroxy silane coated on the surface of the magnetic metal thin film for protecting, preserving and enhancing the full life of the record member.

4. A magnetic record member comprising:
a mirror polished alloy disc;
a magnetic metal thin film medium coated directly on the alloy disc; and
a polysilicate film medium containing 2 to about 56 weight percent silanol radicals formed by the dehydrating-condensation-polymerization of tetrahydroxy silane coated on the magnetic metal thin medium is thus provided.

5. A magnetic record member as claimed in claims 1, 2, 3 or 4 in which the thickness of said polysilicate film is up to 3 $\mu$m.

6. A magnetic record member as claimed in claims 1 or 3 wherein said alloy disc is an aluminum alloy disc, said non-magnetic alloy layer is a Ni-P alloy layer, said magnetic metal thin film medium is a Co-Ni-P plate, and wherein said polysilicate film includes 10 to 56% by weight silanol radicals and has a thickness of about 0.05–0.1 micron.

7. A magnetic record member as claimed in claims 2 or 4 wherein said alloy disc is an aluminum alloy disc, said magnetic metal thin film medium is a plated Co-Ni-P and wherein said polysilicate film includes 10–56 weight percent silanol radicals and has a thickness of about 0.05–0.1 micron.

* * * * *